United States Patent
Brown et al.

(10) Patent No.: US 10,585,598 B2
(45) Date of Patent: Mar. 10, 2020

(54) MODIFYING ACCESSIBILITY BASED ON MEMORY ACCESS PATTERNS

(71) Applicant: HEWLETT PACKARD ENTERPRISE DEVELOPMENT LP, Houston, TX (US)

(72) Inventors: Andrew Brown, Houston, TX (US); Erin A. Handgen, Fort Collins, CO (US); Bryan Stiekes, Brownstown Township, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 153 days.

(21) Appl. No.: 15/719,968

(22) Filed: Sep. 29, 2017

(65) Prior Publication Data
US 2019/0102091 A1    Apr. 4, 2019

(51) Int. Cl.
*G06F 3/06* (2006.01)

(52) U.S. Cl.
CPC ............ *G06F 3/0617* (2013.01); *G06F 3/061* (2013.01); *G06F 3/0604* (2013.01); *G06F 3/065* (2013.01); *G06F 3/0647* (2013.01); *G06F 3/0653* (2013.01); *G06F 3/0685* (2013.01); *G06F 3/0688* (2013.01)

(58) Field of Classification Search
CPC ...... G06F 3/0617; G06F 3/0647; G06F 3/065; G06F 3/0653; G06F 3/0685; G06F 3/0688
See application file for complete search history.

(56) References Cited

U.S. PATENT DOCUMENTS

| | | | |
|---|---|---|---|
| 9,123,409 B2 | 9/2015 | Eilert et al. | |
| 9,317,212 B2 | 4/2016 | Huffman et al. | |
| 9,378,088 B1 * | 6/2016 | Piszczek | G06F 16/182 |
| 9,477,551 B1 * | 10/2016 | Piszczek | G06F 16/119 |
| 2011/0023048 A1 * | 1/2011 | Srinivasan | G06F 3/061 718/105 |
| 2014/0108707 A1 * | 4/2014 | Nowoczynski | G06F 12/0246 711/103 |
| 2014/0359196 A1 | 12/2014 | Ragland et al. | |
| 2016/0100006 A1 * | 4/2016 | Markus | H04L 67/1097 709/219 |
| 2016/0301754 A1 * | 10/2016 | Lee | G06F 16/10 |
| 2018/0018196 A1 * | 1/2018 | Dean | G06F 9/45558 |
| 2018/0095872 A1 * | 4/2018 | Dreier | G06F 3/0689 |
| 2018/0293172 A1 * | 10/2018 | Blake | G06F 12/0857 |
| 2019/0012484 A1 * | 1/2019 | Gulati | G06F 12/0246 |

OTHER PUBLICATIONS

Liu, W. et al., "Performance Evaluation and Modeling of HPC I/O on Non-volatile Memory," (Research Paper), May 10, 2017, 10 pgs, https://arxiv.org/pdf/1705.03598.pdf.

Wang, C. et al., "NVMalloc: Exposing an Aggregate SSD Store as a Memory Partition in Extreme-Scale Machines," (Research Paper), Sep. 20, 2011, 12 pages, http://www.csm.ornl.gov/~vazhkuda/NVMalloc.pdf.

* cited by examiner

*Primary Examiner* — Ryan Bertram
(74) *Attorney, Agent, or Firm* — Hewlett Packard Enterprise Patent Department

(57) ABSTRACT

Data requests for data stored in a non-volatile media may be monitored and used to identify if the media is being used as memory or storage. The accessibility of the data may be modified based on the identified usage model.

16 Claims, 3 Drawing Sheets

MODIFYING ACCESSIBILITY BASED ON MEMORY ACCESS PATTERNS

BACKGROUND

Some communication interconnects allow memory and storage transactions to coexist on the same network fabric. For example, a computing system may include a plurality of processing nodes connected to a large pool of non-volatile media (NVM), such as phase change or memristor based media.

BRIEF DESCRIPTION OF THE DRAWINGS

Certain examples are described in the following detailed description and in reference to the drawings, in which.

DETAILED DESCRIPTION OF SPECIFIC EXAMPLES

In a shared computing environment where NVM is behaving or being implemented as two different types of media (e.g., memory or RAM, and storage), the topology of the infrastructure connecting processing nodes to the NVM may impact the performance attributes of the media. As used herein, memory refers to a data storing media that is directly accessed by a processor via a load/store architecture, typically in cache line-sized increments, while storage refers to data that is block accessed and loaded into memory before being manipulated by a processor using loads and stores.

Implementations of the described technology allow the identification of type of media accesses and the locations that those accesses are taking place. Based on the identification, the accessibility of the data may be improved. For example, if the media accesses indicate the use of the NVM as memory, the accessibility of the data may be improved by reducing the latency to access the data. For example, the network distance between the process creating the requests and the data may be reduced by moving the process or moving the data. As another example, if the media accesses indicate the use of the NVM as storage with multiple accessing nodes, the average network distance between the accessing nodes and the NVM may be reduced. As a further example, if the data accesses indicate that the NVM is used as read-only storage, the NVM may be replicated for multiple processes.

Figure 1:
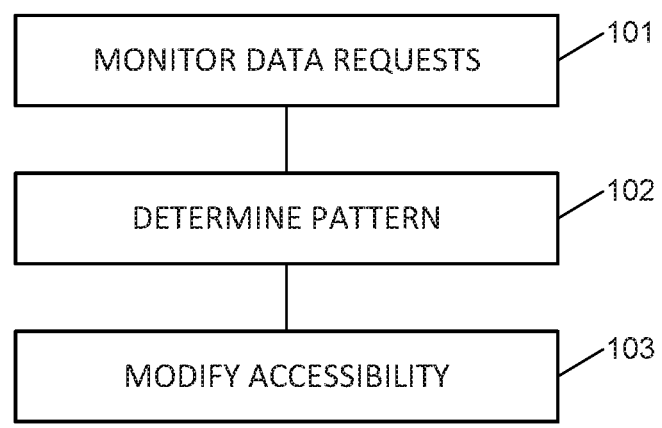
FIG. 1 illustrates an example method of improving data accessibility.

FIG. 1 illustrates an example method of improving data accessibility. For example, the method may be performed by a system controller, such as a librarian that allocates address ranges of the NVM to requesting system nodes. As another example, the method may be performed by a fabric switch within the fabric, or a bridging device connecting a compute node to the fabric.

The method includes block 101. Block 101 may include monitoring data requests for data stored in a non-volatile media. For example, block 101 may include monitoring data read requests or data store requests. Monitoring may include monitoring all received data requests or sampling received requests at a sampling rate.

The monitoring may include collecting information from the access requests themselves. For example, the monitoring may comprise a switch or bridge device performing packet inspection of received data access requests. For example, a fabric bridge may receive the requests from a processor and transmit the requests to the NVM via a fabric. The information monitored may include various information obtainable from the requests. For example, monitoring may include collecting addresses of the requested data, source identifying information, destination identifying information, or other packet header or body information. In some cases, monitoring may include collecting permission information or other attributes. In further implementations, monitoring may include collecting payload information. For example, monitoring may include collecting payload information from store requests or responses to load requests.

The monitoring may also include receiving information about the requests from fabric elements that receive the requests. For example, the monitoring may be performed by a system librarian that receives event information associated with the requests. For example, compute nodes, fabric bridges, switches, or NVM modules may transmit event information regarding the requests to the system librarian. For example, the event information may be information regarding the cause of the request along with information identifying the specific request. For example, a compute node may send event information to the librarian along with packet identification information associating a data request with a cache miss. As another example, tracking flags may be added to request the requester creating the request or may be added to requests in transit. Receipt of a request with a tracking flag may trigger the receiving device to send event information to the monitoring device.

The method further includes block 102. Block 102 includes determining a pattern for the requests monitored in block 101. The pattern indicates that the NVM associated with the requested data is being used as storage or is being used as memory. In some implementations, the pattern is determined by comparing the requests to various usage models for memory access and storage access. For example, sequential reads from a single node to a region of NVM, sequential aligned access to common storage block sizes (e.g., 512B, 2048B, etc . . . ), or repeated access to file system metadata (e.g., file allocation tables) may indicate that that NVM region is being used as storage. In some implementations, the data requests may be writes as well as reads. Block 102 may include identifying the pattern based on writes. For example, cache-line sized series of writes may be used to identify the NVM as being used as memory, while larger sizes may be used to identify the NVM as storage.

As further examples, non-sequential reads from a node to an NVM region, random access cache-line sized accesses, or program counter (PC) accesses may indicate the NVM region is being used as memory. As further examples, a pattern of a region being accessed by multiple nodes may indicate that the region is being used as storage. As another example, using event data gathered from flag requests, a system librarian may determine a pattern indicating cache misses, which indicate that the region is being used as memory. In some cases, the degree to which the monitored information matches a pattern may be used to determine a confidence level for the determined usage model of the data region.

In further implementations, the pattern may include further usage information. In some cases, the pattern may indicate that the region is being used as storage to store executable code, media data, or database data. For example, a region of memory accessed in a read only manner by many compute nodes in a bursty manner may indicate that the region stores code for a micro service. As another example, the pattern may indicate that the region is being used a memory to store program code under execution. As further examples, the pattern may include temporal information. For example, the requests may be used to identify a region of NVM that is being used as a boot image or may be used to identify a region of NVM that is no longer being used as frequently. In some implementations, the device may determine patterns for different sets of requests to identify various NVM regions that are being used in different ways.

In further implementations, block 102 may include comparing the monitored information with expected usage information. For example, data regions of the NVM may be labeled or otherwise associated with expected usage information. For example, the expected usage information may be provided by a compute node, or a system administrator when the memory region is initially requested and allocated. If the expected usage information matches the monitored data pattern, then the system may increase a confidence level that the data region has been correctly identified as storage or memory.

The method further includes block 103. Block 103 includes modifying the accessibility of the data based on the pattern identified in block 102. Modifying the accessibility of the data may include improving the accessibility of the data. For example, for data that is being used as memory, block 102 may comprise reducing the latency or improving the bandwidth for accessing the data. For example, the latency may be improved by moving the data to a new NVM module that is topologically closer to the process producing the requests. As another example, the accessibility may be improved by migrating the process producing the requests from a first node to a second node that is closer to the NVM. As a further example, accessibility may be improved by moving the data or the process to a less congested region of the network. As a further example, a region being used as storage but storing executable code may be moved closer to a requesting compute node to allow quicker start up time.

In some cases, modifying the accessibility may include balancing the location of the region subject to the data requests. For example, a region of NVM that is identified as used as storage with multiple clients may be moved to a location on the fabric that improves the average latency, bandwidth, or other metric among the clients access in the data.

Modifying the accessibility of the data may also include reducing the accessibility of the data. For example, a region of NVM used as storage may be less latency-sensitive, and modifying the accessibility of the data may include moving the data to an NVM that is farther from the requesting process. The newly freed region that is closer to the process may then be used for memory data.

Modifying the accessibly of the data may also include replicating the data. For example, if a region of NVM is being used as storage by multiple requesters, the region may be replicated by creating a copy of the region on another NVM module. In some cases, load balancing may be employed to distribute future reads amongst the copies. In other cases, copies may be reserved for different groups of the requesters, and incoming requests for the copied region may be rerouted to the corresponding reserved copy. In some instances, the replicated copies may be kept coherent with the original copy. In other cases, if a write occurs, it may be redirected to the original copy and the replicated copies may be invalidated.

In some cases, modifying the accessibility of the data may include compacting the data. For example, using cache miss event data and data gleaned from monitoring data requests, the system may determine that two different NVM regions are part of a compute node's working memory set. Modifying the accessibility may include combining these two regions into a single region to compact the working set.

In some implementations, modifying the accessibility of the data may comprise balancing the location of data regions on the fabric according to a plurality of matched patterns. For example, data regions identified as being used as memory may be moved closer to their associated compute nodes at the expense of moving regions being used as storage farther from their associated compute nodes. In some implementations, data migration may be performed based on the current usage model of the target NVM region as well as the source region. In an example implementation, if data used as memory is to be moved closer to the process using the data, then it may preferentially be moved to an unused region. If an unused region is unavailable, it may displace data used as storage if the storage data can be moved an acceptable distance away from its corresponding process(es). If a region currently used as storage is unavailable, a region used as memory may be displaced if it can be moved to a location that is as far from its corresponding process. How the data regions are balanced with respect to each other may be performed according to system priorities provided by a system administrator or pre-programmed into the device performing the method.

In further implementations, modifying the accessibility of the data may comprise changing network parameters to modify the accessibility. For example, the quality of service for certain regions may be modified based on usage model. As another example, the bandwidth allocated for various regions may be modified based on usage model.

In some implementations, the described method may be performed on the fly. For example, whenever sufficient data requests have been received to achieve a threshold confidence of the usage model of a region of NVM, that region may be relocated as described above. In other implementations, the method may be performed on a scheduled basis. For example, a monitoring period may take place where data requests are monitored throughout the system. Then, a rebalancing period may take place where data is migrated or replicated according to their usage model and the usage models of the other regions. In further implementations, both processes may take place. For example, data may be temporarily migrated or replicated based on initial data request monitoring, and then moved to a more optimal location at the end of a system wide monitoring period.

Figure 2:
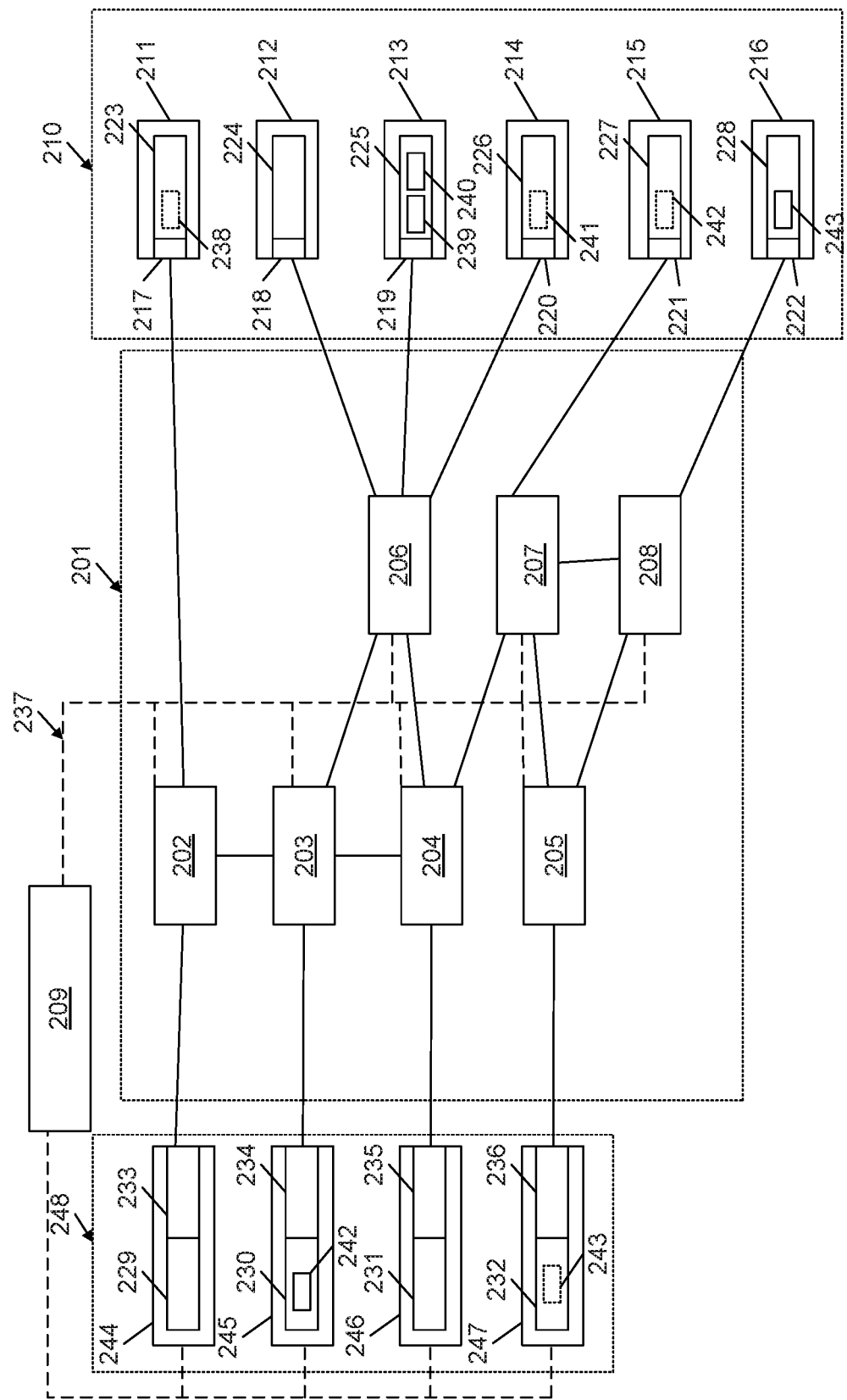
FIG. 2 illustrates an example system including non-volatile media (NVM) and a device to improve the accessibility of a process or data according to a determined usage model.

FIG. 2 illustrates an example system including non-volatile media (NVM) and a device to improve the accessibility of a process or data according to a determined usage model. The example system includes a fabric 201 connecting a plurality of compute nodes 248 to a plurality of NVM modules 210. The example fabric 201 comprises a set of interconnected switches 202-208. Different topologies may be employed in various implementations. In the illustrated example, the compute nodes are connected to the NVM modules in an all-to-all topology (each compute node is connected to each NVM module through the fabric) in a multi-hop topology with different numbers of hops connecting different compute node/NVM pairs.

Each compute node 244-247 comprises a processor 229-232 and bridge device 233-236 that interfaces with the fabric 201. For example, the bridge devices may comprise communications interfaces that communicate on the fabric using a fabric communications protocol. The bridge devices may be connected to the corresponding processor's memory controller and/or storage controller or may comprise a third controller, or may comprise a unified storage and memory controller.

Similarly, each NVM module 211-216 comprises a NVM volume 223-228 and a media controller 217-222. Each NVM volume may comprise a set of NVM that stores data, such as set of memristors, phase-change memory elements, or other non-volatile media elements. The media controllers may comprise communication interfaces to communicate on the fabric. The media controllers may further comprise circuitry to store and retrieve data from the NVM volumes.

The system further includes a system librarian 209. The system librarian 209 allocates regions of NVM from the pool of NVM 210 to the compute nodes 248. In the illustrated example, the librarian maintains an inventory of the address space of the NVM modules 210 and assigns NVM regions to the compute nodes 248 upon request from the compute nodes 248 or upon request from other system elements. For example, the librarian 209 may assign the NVM regions as address ranges. In some implementations, the librarian 209 may control permissions to the regions. For example, the librarian may control read & write permissions to the regions or may grant multiple compute nodes permissions to access certain regions. In the illustrated example, the librarian is connected to the devices making up the fabric 201. For example, the devices may interact with the NVM 210 to perform data migration or copy operations and may inform the librarian to allow the librarian to update its tracked NVM allocation. In the illustrated example, the librarian is connected to the other system devices via an out-of-band management network 237. In other examples, the librarian may be connected via the fabric 201.

In the illustrated example, the system includes a data request monitor to monitor requests for the data stored on the NVM 210. In some implementations, the device may monitor the requests by inspecting packets that the device operates on in its role as a network device. For example, if the data request monitor is a fabric bridge 233 or a switch 202, monitoring the requests may comprise inspecting data requests that flow through the device on the fabric. For example, bridge 235 may monitor data requests by inspecting packets generated by processor 231 and inspecting packets destined for the processor 231. In some cases, multiple network devices may be data request monitors.

In some implementations, the data request monitor may monitor the requests by receiving information about data requests that are carried on the fabric. For example, in an implementation where a designated switch 204 controls the data accessibility, the other switches 202, 203, 205-208 may send copies of requests, or inspection information regarding the data requests that flow through the switches. For example, the other switches may send source, destination, process, node ID, or other header information to the designated switch 204. As a further example, the other switches may send information derived from deep packet inspection of the request payloads. Similarly, in an implementation where the librarian 209 is the data request monitor, the switches 201 may send information to allow the librarian to monitor data requests. In further implementations, the other network elements, such as the fabric bridges 233-236 or media controllers 217-222 may send data request information to the controller.

The system further includes a controller. In some implementations, the controller may be one of the fabric bridges 233-236. In other implementations, the controller may be the system librarian 209. In further implementations, the controller may be a switch 202, 203, 204, 205, 206, 207, or 208. In some cases, the system may include multiple controllers to modify data accessibility. For example, each fabric bridge 233, 234, 235, 236 may modify accessibility for the compute node 244, 245, 246, 247 to which it is attached. As another example, each switch 202, 203, 204, 205, 206, 207, 208 may modify the accessibility for data based on data flows through each respective switch. In other implementations, a single device may coordinate for the entire system. For example, the system librarian 209 may communicate with the other system devices to modify data accessibility.

In some implementations, the controller may be the same device as the data request monitor. For example, a switch 202 may be both a controller and data request monitor for node 244. In further implementations, the controller may a different device than the data request monitor. For example, the controller may be the librarian 209 and receive information from data request monitors such as the fabric bridges, switches, or other network nodes. In still further implementations, the controller may be a data request monitor and receive information from other data request monitors. For example, the controller may be a switch 206 and may receive information regarding received requests from the other switches 202-205, 207, 208 or bridges 233-236.

The controller is to determine a usage model for the received requests. For example, the controller may be to determine the usage model based on information regarding the received requests received from a data monitor. As another example, the controller may be to determine the usage model based on copies of the requests received from a data monitor. The usage model indicates that the non-volatile media is being used as non-volatile storage or that the non-volatile media is being used as volatile memory. The controller may perform block 102 of FIG. 1 to determine the usage model.

In some cases, the controller may determine that the NVM has a storage usage model. In some implementations, the controller may determine the usage model from data requests sent by a single compute node. For example, the controller may determine that the requests indicate that the non-volatile media is being used as storage by determining that the requests sequentially access the data. For example, by determining that the addresses contained within the data requests are in a sequential order. In some cases, the usage model may be determined according to multiple conditions. For example, a length of the sequential accesses corresponding to storage block sizes or block sized address spans within the sequence may be used to identify that a region of NVM is being used as storage.

In further implementations, the controller may determine the usage model from data requests sent by multiple compute nodes. For example, in a clustered computer system, a region of NVM that is being accessed by multiple compute nodes may be identified as being used as storage. As another example, the controller may store the locations of various file system metadata such as file tables. If the controller determines that the access requests repeatedly access the file system metadata, then the controller may determine that the NVM is being used as storage.

In other cases, the controller may determine that the NVM has a memory usage model. For example, a burst of writes to a cache-line sized region of NVM may indicate that the NVM is being used as a memory. As another example, random access patterns to cache-line or smaller portions of NVM may indicate that the NVM is being used as memory.

The controller is further to use usage model to modify the accessibility between a process that generates data requests and the data subject to the requests. The controller may modify the accessibility by performing block 103 of FIG. 1.

For example, the controller may modify the accessibility by migrating the process from a first node to a second note that is closer the NVM that stores the data. For example, in FIG. 2, process 242 accesses data in region 243 of NVM 228 as memory. Processor 242 is five network hops away from NVM region 243. The controller may identify a node 247, which is three hops away from region 243. Accordingly, the controller may migrate the process to processor 232 to create migrated process 243 which accesses region 243 as memory with lower latency than the pre-migration process 242.

As another example, the controller may modify the accessibility by replicating the data. For example, in FIG. 2, the controller may determine that region 240 is being accessed by nodes 245 and 246 as storage. The controller may replicate the data onto region 242. In some implementations, replication may be reserved for regions that being accessed as read-only, such as media data. In other implementations, the replicated regions may be kept synchronized through various storage area networking (SAN) methods.

As another example, the controller may modify the accessibility by migrating the data to another NVM. For example, the controller may move the data closer to or farther from the process accessing the region depending on balancing constraints. As an example, in FIG. 2, region 239 is being used as storage by node 245 while region 240 is being used as memory by node 246. In this example, the controller may modify the accessibility of the data by migrating the data in region 239 to region 238. In this example, the network distance (number of hops) remains the same, but NVM module 213 now services fewer requests, potentially improving its latency while servicing the memory requests to region 240.

Figure 3:
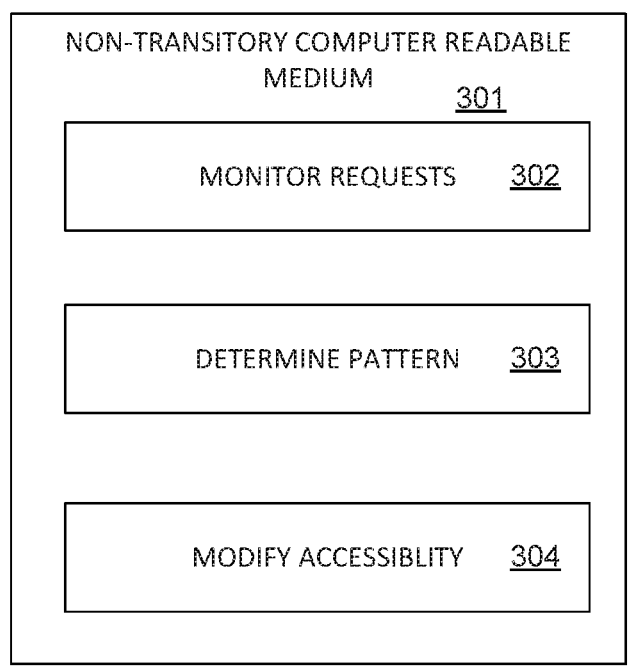
FIG. 3 illustrates a non-transitory computer-readable medium storing instructions to cause a processor to modify the accessibility of a process that generates data requests or data accessed by the requests.

FIG. 3 illustrates a non-transitory computer-readable medium storing instructions to cause a processor to modify the accessibility of a process that generates data requests or data accessed by the requests. For example, the medium 301 may be memory such as random access memory, storage such as flash or hard drive storage, or a non-volatile media used as memory or storage. The medium 301 may be a part of a controller as described with respect to FIG. 2 and may include instructions executable by a processor to perform a method as described with respect to FIG. 1.

The medium 301 includes instruction set 302. Instruction set 302 is executable by the processor to monitor requests corresponding to a non-volatile media (NVM) region on a fabric connected to non-volatile media used as storage and non-volatile media used as memory. Instruction set 302 may be executable by the processor to perform block 101 of FIG. 1. For example, instruction set 302 may be executable to cause a controller to monitor requests that the controller receives in its role as a switch or bridge. As another example, instruction set 302 may be executable by the processor to cause a controller to receive information regarding the requests from other network devices.

The medium 301 further includes instruction set 303. Instruction set 303 is executable by the processor to determine a pattern for the requests to determine if the NVM region is being used as storage or as memory. For example, instruction set 303 may be executable to perform block 102 of FIG. 1.

The medium 301 further includes instruction set 304. Instruction set 304 may be executable by the processor to modify the accessibility of at least one of: a process that generated the requests, or the data accessed by the requests. The modification may be based on the pattern determined during execution of instruction set 302. The instructions 304 may be executable by the processor to perform block 103 of FIG. 1. For example, the instructions 304 may be executable by the processor to modify the accessibility of the data by migrating the data stored in the NVM region to a second NVM closer to the process that generated the requests.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
monitoring data requests for data stored in a non-volatile media;
determining a pattern for the requests, the pattern indicating that the non-volatile media is being used as storage or that the non-volatile media is being used as memory; and
modifying accessibility of the data accessed by the requests based on the pattern;
wherein determining the access pattern indicates the non-volatile media is being used as storage comprises determining that the access requests repeatedly access file system metadata stored on the non-volatile media.

2. The method of claim 1, wherein modifying the accessibility of the data comprises migrating a process producing the requests from a first node to a second node that is closer to the non-volatile media than the first node.

3. The method of claim 1, wherein modifying the accessibility of the data comprises replicating the data.

4. The method of claim 1, wherein modifying the accessibility of the data comprises moving the data to a second non-volatile media that is closer to a node executing the process that generated the access requests.

5. The method of claim 1, wherein the method is performed by a system librarian,
wherein the system librarian receives the requests from a fabric bridge connected to a processor, and
wherein the fabric bridge transmits the requests to the non-volatile media via a fabric.

6. The method of claim 1, wherein modifying the accessibility of the data comprises:
determining that the requests are associated with multiple requestors; and
responsive to determining that the requests are associated with multiple requestors, replicating the data onto a second non-volatile media.

7. The method of claim 1, wherein the method is performed by a system librarian, wherein the librarian receives event information associated with the requests, and determines the pattern using the event information.

8. The method of claim 1, wherein monitoring the requests comprises receiving tracking data corresponding to a flagged request.

9. A system comprising:
non-volatile media, wherein the non-volatile media stores data; and
a data request monitor to monitor requests for the data stored on the non-volatile media;
a controller to:
  determine a usage model for the received requests, wherein the usage model indicates that the non-volatile media is accessed as storage or as memory; and
  modify accessibility between a process that generates the requests for the data and the data accessed by the requests based on the usage model;
  wherein determining the usage model indicates the non-volatile media is being used as storage comprises determining that the access requests repeatedly access file system metadata stored on the non-volatile media.

10. The system of claim 9,
wherein the system comprises a first node executing the process,
and a second node,
wherein to modify the accessibility, the controller is to migrate the process from the first node to the second node, wherein the second node is closer to the non-volatile media that is storing the data than the first node.

11. The system of claim 9, wherein the controller is to modify the accessibility by replicating the data.

12. The system of claim 9, wherein the controller is to modify the accessibility by moving the data to a location of the non-volatile media that is closer to a node executing the process that generated the access requests.

13. The system of claim 9, wherein:
the controller comprises a system librarian;
the system librarian receives data regarding the requests from a fabric bridge that transmits the requests to the non-volatile media via a fabric.

14. The system of claim 9, wherein modifying the accessibility of the data comprises:
determining that the access requests are associated with multiple requestors; and
responsive to determining that the access requests are associated with multiple requestors, replicating the data.

15. A non-transitory computer-readable medium storing instructions that cause a processor to:
monitor requests corresponding to a non-volatile media (NVM) region on a fabric connected to non-volatile media used as storage and non-volatile media used as memory;
determine a pattern for the requests to determine if the NVM region is being used as storage or as memory; and
based on the pattern, modify accessibility of at least one of: a process that generated the requests, or the data accessed by the requests;
wherein determining the access pattern indicates the non-volatile media is being used as storage comprises determining that the access requests repeatedly access file system metadata stored on the non-volatile media.

16. The non-transitory computer-readable medium storing instructions to cause the processor to modify the accessibility of the data by migrating the data stored in the NVM region to a second NVM closer to the process that generated the requests.

* * * * *